United States Patent
Du et al.

(10) Patent No.: US 12,051,446 B2
(45) Date of Patent: Jul. 30, 2024

(54) VIDEO PROCESSING METHOD AND APPARATUS AND TERMINAL DEVICE

(71) Applicant: Huawei Technologies Co., Ltd., Shenzhen (CN)

(72) Inventors: Xiao Du, Shenzhen (CN); Wen Zhou, Shenzhen (CN); Pengfei Hou, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 179 days.

(21) Appl. No.: 17/843,690

(22) Filed: Jun. 17, 2022

(65) Prior Publication Data
US 2022/0328071 A1 Oct. 13, 2022

Related U.S. Application Data

(63) Continuation of application No. PCT/CN2020/124494, filed on Oct. 28, 2020.

(30) Foreign Application Priority Data

Dec. 18, 2019 (CN) .......................... 201911309949.9

(51) Int. Cl.
*G11B 27/00* (2006.01)
*G11B 27/031* (2006.01)
*G11B 27/036* (2006.01)

(52) U.S. Cl.
CPC ................................. *G11B 27/036* (2013.01)

(58) Field of Classification Search
CPC ..... G11B 27/031; G11B 27/036; G11B 27/00; H04N 21/23424; H04N 21/433; H04N 21/44004; H04N 21/44016

USPC ................ 386/287, 278, 282, 280, 326, 236
See application file for complete search history.

(56) References Cited

U.S. PATENT DOCUMENTS

| 6,400,414 B1 | 6/2002 | Tsukida | |
| 6,993,081 B1 * | 1/2006 | Brunheroto | H04N 21/23406 375/E7.014 |
| 7,145,912 B1 * | 12/2006 | Schwartz | H04N 21/23655 370/395.7 |

(Continued)

FOREIGN PATENT DOCUMENTS

| CN | 101909161 A | 12/2010 |
| CN | 101931773 A | 12/2010 |

(Continued)

*Primary Examiner* — Daquan Zhao
(74) *Attorney, Agent, or Firm* — Leydig, Voit & Mayer, Ltd.

(57) ABSTRACT

A video processing method, apparatus and a terminal device are provided, which relate to the field of video processing technologies. The method includes: when detecting in a video recording process that a user enables a video editing function, presenting a recorded original video stream in a form of a video frame; determining a to-be-edited video frame based on a video frame selection operation that is performed by the user on the video frame; performing video editing on the to-be-edited video frame based on a video frame editing operation input by the user, to generate an edited video stream; and generating a target video stream based on the edited video stream and the original video stream. According to this application, live video editing flexibility can be improved.

20 Claims, 5 Drawing Sheets

(56) References Cited

U.S. PATENT DOCUMENTS

| | | | |
|---|---|---|---|
| 2006/0156219 A1 | 7/2006 | Haot et al. | |
| 2007/0074115 A1 | 3/2007 | Patten et al. | |
| 2012/0195573 A1 | 8/2012 | Flint et al. | |
| 2014/0173677 A1* | 6/2014 | Lohmar | H04N 21/8456 |
| | | | 725/116 |
| 2014/0269938 A1 | 9/2014 | Guedalia et al. | |
| 2014/0282771 A1* | 9/2014 | Tumuluru | H04N 21/234327 |
| | | | 725/95 |
| 2017/0127056 A1 | 5/2017 | Batmunkh et al. | |

FOREIGN PATENT DOCUMENTS

| | | |
|---|---|---|
| CN | 102243615 A | 11/2011 |
| CN | 102625050 A | 8/2012 |
| CN | 102740162 A | 10/2012 |
| CN | 103533442 A | 1/2014 |
| CN | 103916535 A | 7/2014 |
| CN | 104052935 A | 9/2014 |
| CN | 104113777 A | 10/2014 |
| CN | 105280205 A | 1/2016 |
| CN | 106331869 A | 1/2017 |
| CN | 106851385 A | 6/2017 |
| CN | 107454416 A | 12/2017 |
| CN | 107992246 A | 5/2018 |
| CN | 108259788 A | 7/2018 |
| CN | 108495171 A | 9/2018 |
| CN | 108635851 A | 10/2018 |
| CN | 109195007 A | 1/2019 |
| CN | 110049266 A | 7/2019 |
| KR | 20160091468 A | 8/2016 |
| WO | 2009079560 A1 | 6/2009 |

\* cited by examiner

VIDEO PROCESSING METHOD AND APPARATUS AND TERMINAL DEVICE

CROSS-REFERENCE TO RELATED APPLICATIONS

This application is a continuation of International Application No. PCT/CN2020/124494, filed on Oct. 28, 2020, which claims priority to Chinese Patent Application No. 201911309949.9, filed on Dec. 18, 2019. The disclosures of the aforementioned applications are hereby incorporated by reference in their entireties.

TECHNICAL FIELD

Embodiments of this application relate to the field of video processing technologies, and in particular, to a video processing method and apparatus and a terminal device.

BACKGROUND

With a rapid increase of network bandwidth and popularization of smartphones, more and more live video streaming applications emerge. For these live streaming applications, most content is directly provided by live streaming users. As most of the live streaming users are non-professional photographers and errors may occur in a recording process, some problems are prone to occur in a playback process. Consequently, live streaming quality is degraded.

To improve the live streaming quality, many live video streaming applications provide the live streaming users with some video editing functions, so that the live streaming users can make simple edits to live videos. Currently, a common video editing function is video beautification. To be specific, the live video streaming applications provide some video beautification functions such as filter addition and face beautification. When a user selects a video beautification function in a live video streaming process, a live video streaming application provides a corresponding beautification algorithm to beautify a live video.

However, currently, these common video editing functions have poor video editing flexibility.

SUMMARY

In view of this, this application provides a video processing method and apparatus and a terminal device, to improve live video editing flexibility.

To achieve the foregoing objective, according to a first aspect, an embodiment of this application provides a video processing method, including:

when detecting in a video recording process that a user enables a video editing function, presenting a recorded original video stream in a form of a video frame;

determining a to-be-edited video frame based on a video frame selection operation that is performed by the user on the video frame;

performing video editing on the to-be-edited video frame based on a video frame editing operation input by the user, to generate an edited video stream; and generating a target video stream based on the edited video stream and the original video stream.

In this embodiment, the recorded original video stream is presented in the form of the video frame when it is detected in the video recording process that the user enables the video editing function; then the to-be-edited video frame is determined based on the video frame selection operation that is performed by the user on an original video frame; video editing is performed on the to-be-edited video frame based on the video frame editing operation input by the user, to generate the edited video stream; and finally, the target video stream is generated based on the edited video stream and the original video stream. In this way, the user can select a to-be-edited video frame for editing in the video recording process. This can improve video editing flexibility, and further ensure real-time transmission of the video stream.

In a possible implementation of the first aspect, after the determining a to-be-edited video frame, the method further includes:

determining an association frame of the to-be-edited video frame based on an editing effect application range of the to-be-edited video frame, where the association frame is a video frame that is indicated by the editing effect application range and for which a same editing effect as the to-be-edited video frame is used, and the editing effect application range is preset or determined by the user after the user selects the to-be-edited video frame; and determining the association frame as a to-be-edited video frame.

In the foregoing implementation, the user can set the editing effect application range. This further improves video editing flexibility.

In a possible implementation of the first aspect, the editing effect application range is preset, and before the determining a to-be-edited video frame, the method further includes:

presetting an editing effect application range corresponding to each editing effect based on a user operation of setting an editing effect application range.

In the foregoing implementation, the user can set different editing effect application ranges for different editing effects. This further improves video editing flexibility.

In a possible implementation of the first aspect, the editing effect application range includes at least one of the following: an editing effect is applied to a corresponding to-be-edited video frame; an editing effect is applied to a corresponding to-be-edited video frame and some frames following the corresponding to-be-edited video frame; or an editing effect is applied to a corresponding to-be-edited video frame and all frames following the corresponding to-be-edited video frame.

In a possible implementation of the first aspect, the generating a target video stream based on the edited video stream and the original video stream includes:

replacing a to-be-edited video frame in the original video stream with a null frame to generate a transmission video stream, where the null frame includes frame header information of the corresponding to-be-edited video frame; and inserting, based on frame header information, a video frame in the edited video stream into a corresponding null frame location in the transmission video stream that has undergone sequencing, to generate the target video stream.

The to-be-edited video frame in the original video stream is replaced with the null frame. In this way, a data transmission and processing amount is reduced and a location for a video frame is occupied. When the target video stream is generated, a corresponding edited video frame can be quickly inserted into the transmission video stream based on a null frame location. This can improve efficiency of generating the target video stream.

In a possible implementation of the first aspect, before the generating a target video stream, the method further includes:

allocating the transmission video stream to a first encoding channel for encoding; and allocating the edited video stream to a second encoding channel for encoding.

In the foregoing implementation, efficiency of transmitting the video stream in a terminal device can be improved.

In a possible implementation of the first aspect, a quantity of first encoding channels and a quantity of second encoding channels are dynamically allocated based on a quantity of video frames in the edited video stream.

In the foregoing implementation, the efficiency of transmitting a video stream in the terminal device can be further improved.

In a possible implementation of the first aspect, the inserting, based on frame header information, a video frame in the edited video stream into a corresponding null frame location in the transmission video stream that has undergone sequencing includes:

sequencing video frames in the transmission video stream based on frame header information, so that the video frames in the transmission video stream are sequentially arranged; and for each null frame in the transmission video stream, after a target video frame corresponding to the null frame is found in the edited video stream, inserting the found target video frame into a corresponding null frame location in the transmission video stream that has undergone sequencing.

In a possible implementation of the first aspect, before the inserting the found target video frame into a corresponding null frame location in the transmission video stream that has undergone sequencing, the method further includes:

checking the found target video frame based on frame header information; and determining that the found target video frame is successfully checked.

In the foregoing implementation, data accuracy of the generated target video stream can be improved.

In a possible implementation of the first aspect, before the determining a to-be-edited frame, the method further includes:

numbering a video frame in the original video stream, and adding a number to frame header information of the corresponding video frame; and the inserting, based on frame header information, a video frame in the edited video stream into a corresponding null frame location in the transmission video stream that has undergone sequencing includes:

inserting, based on a video frame number, the video frame in the edited video stream into the corresponding null frame location in the transmission video stream that has undergone sequencing.

In the foregoing implementation, efficiency of generating the target video stream can be improved.

In a possible implementation of the first aspect, the inserting, based on a video frame number, the video frame in the edited video stream into the corresponding null frame location in the transmission video stream that has undergone sequencing includes:

inserting, based on the video frame number and the frame location, the video frame in the edited video stream into the corresponding null frame location in the transmission video stream that has undergone sequencing.

In the foregoing implementation, efficiency of generating the target video stream can be improved, and data accuracy of the generated target video stream can also be improved.

In a possible implementation of the first aspect, the inserting, based on frame header information, a video frame in the edited video stream into a corresponding null frame location in the transmission video stream that has undergone sequencing, to generate the target video stream includes:

transmitting the transmission video stream and the edited video stream to a target device through different transmission channels, to indicate the target device to insert, based on the frame header information, the video frame in the edited video stream into the corresponding null frame location in the transmission video stream that has undergone sequencing, to generate the target video stream.

In a possible implementation of the first aspect, the transmission channels include a first transmission channel for transmitting the transmission video stream and a second transmission channel for transmitting the edited video stream, and a quantity of first transmission channels and a quantity of second transmission channels are dynamically allocated based on a quantity of video frames in the edited video stream.

In the foregoing implementation, efficiency of transmitting the video stream can be improved.

In a possible implementation of the first aspect, the method further includes:

in a process of inserting the video frame in the edited video stream into the transmission video stream that has undergone sequencing, marking a video frame preceding to a target null frame in the transmission video stream to be in a processed state, where the target null frame is an earliest null frame in the transmission video stream.

In a possible implementation of the first aspect, frame header information of the video frame in the edited video stream includes editing time and/or a frame size of the video frame.

In a possible implementation of the first aspect, the generating a target video stream based on the edited video stream and the original video stream includes:

if all video frames in the original video stream are to-be-edited video frames, replacing the video frames in the original video stream with corresponding video frames in the edited video stream, to generate the target video stream.

According to a second aspect, an embodiment of this application provides a video processing apparatus, including:

a detection module, configured to detect in a video recording process whether a user enables a video editing function;

a display module, configured to present a recorded original video stream in a form of a video frame when the detection module detects that the user enables the video editing function;

a determining module, configured to determine a to-be-edited video frame based on a video frame selection operation that is performed by the user on the video frame;

a first generation module, configured to perform video editing on the to-be-edited video frame based on a video frame editing operation input by the user, to generate an edited video stream; and a second generation module, configured to generate a target video stream based on the edited video stream and the original video stream.

In a possible implementation of the second aspect, the determining module is further configured to:

determine an association frame of the to-be-edited video frame based on an editing effect application range of the to-be-edited video frame after determining the to-be-edited video frame, where the association frame is a video frame that is indicated by the editing effect application range and for which a same editing effect as the to-be-edited video frame is used, and the editing effect application range is preset or determined by the user after the user selects the to-be-edited video frame; and determine the association frame as a to-be-edited video frame.

In a possible implementation of the second aspect, the editing effect application range is preset, and the apparatus further includes:

a setting module, configured to: before the determining module determines the to-be-edited video frame, preset an editing effect application range corresponding to each editing effect based on a user operation of setting an editing effect application range.

In a possible implementation of the second aspect, the editing effect application range includes at least one of the following: an editing effect is applied to a corresponding to-be-edited video frame; an editing effect is applied to a corresponding to-be-edited video frame and some frames following the corresponding to-be-edited video frame; or an editing effect is applied to a corresponding to-be-edited video frame and all frames following the corresponding to-be-edited video frame.

In a possible implementation of the second aspect, the second generation module is specifically configured to:

replace a to-be-edited video frame in the original video stream with a null frame to generate a transmission video stream, where the null frame includes frame header information of the corresponding to-be-edited video frame; and insert, based on frame header information, a video frame in the edited video stream into a corresponding null frame location in the transmission video stream that has undergone sequencing, to generate the target video stream.

In a possible implementation of the second aspect, the second generation module is further configured to:

before generating the target video stream, allocate the transmission video stream to a first encoding channel for encoding, and allocate the edited video stream to a second encoding channel for encoding.

In a possible implementation of the second aspect, a quantity of first encoding channels and a quantity of second encoding channels are dynamically allocated based on a quantity of video frames in the edited video stream.

In a possible implementation of the second aspect, the second generation module is specifically configured to:

sequence video frames in the transmission video stream based on frame header information, so that the video frames in the transmission video stream are sequentially arranged; and for each null frame in the transmission video stream, after a target video frame corresponding to the null frame is found in the edited video stream, insert the found target video frame into a corresponding null frame location in the transmission video stream that has undergone sequencing.

In a possible implementation of the second aspect, the second generation module is further configured to:

check the found target video frame based on the frame header information before inserting the found target video frame into the corresponding null frame location in the transmission video stream that has undergone sequencing; and determine that the found target video frame is successfully checked.

In a possible implementation of the second aspect, the apparatus further includes:

a numbering module, configured to: before the determining module determines the to-be-edited video frame, number a video frame in the original video stream and add a number to frame header information of the corresponding video frame; and the second generation module is specifically configured to: insert, based on a video frame number, the video frame in the edited video stream into the corresponding null frame location in the transmission video stream that has undergone sequencing.

In a possible implementation of the second aspect, the second generation module is specifically configured to:

insert, based on the video frame number and the frame location, the video frame in the edited video stream into the corresponding null frame location in the transmission video stream that has undergone sequencing.

In a possible implementation of the second aspect, the second generation module is specifically configured to:

transmit the transmission video stream and the edited video stream to a target device through different transmission channels, to indicate the target device to insert, based on the frame header information, the video frame in the edited video stream into the corresponding null frame location in the transmission video stream that has undergone sequencing, to generate the target video stream.

In a possible implementation of the second aspect, the transmission channels include a first transmission channel for transmitting the transmission video stream and a second transmission channel for transmitting the edited video stream, and a quantity of first transmission channels and a quantity of second transmission channels are dynamically allocated based on a quantity of video frames in the edited video stream.

In a possible implementation of the second aspect, the second generation module is further configured to:

in a process of inserting the video frame in the edited video stream into the transmission video stream that has undergone sequencing, mark a video frame preceding to a target null frame in the transmission video stream to be in a processed state, where the target null frame is an earliest null frame in the transmission video stream.

In a possible implementation of the second aspect, frame header information of the video frame in the edited video stream includes editing time and/or a frame size of the video frame.

In a possible implementation of the second aspect, the second generation module is specifically configured to:

if all video frames in the original video stream are to-be-edited video frames, replace the video frames in the original video stream with corresponding video frames in the edited video stream, to generate the target video stream.

According to a third aspect, an embodiment of this application provides a terminal device, including a memory and a processor. The memory is configured to store a computer program, and the processor is configured to invoke the computer program to perform the method according to any one of the first aspect or the foregoing possible implementations of the first aspect.

According to a fourth aspect, an embodiment of this application provides a computer-readable storage medium. The computer-readable storage medium stores a computer program. When the computer program is executed by a processor, the method according to any one of the first aspect or the foregoing possible implementations of the first aspect is implemented.

According to a fifth aspect, an embodiment of this application provides a computer program product. When the computer program product runs on a terminal device, the terminal device is enabled to perform the method according to any one of the first aspect or the foregoing possible implementations of the first aspect.

It should be understood that, for beneficial effects of the second aspect to the fifth aspect, refer to related descriptions in the first aspect. Details are not described herein again.

BRIEF DESCRIPTION OF DRAWINGS

To describe the technical solutions in embodiments of this application more clearly, the following briefly describes the accompanying drawings for describing embodiments or the prior art. It is clear that the accompanying drawings in the following description show some embodiments of this application, and persons of ordinary skill in the art may still derive other drawings from these accompanying drawings without creative efforts.

DESCRIPTION OF EMBODIMENTS

A current live video editing manner can only be used to edit all video frames, and consequently is inflexible. To solve this technical problem, embodiments of this application provide a video processing method and apparatus and a terminal device. In the video processing method, a recorded original video stream is presented in a form of a video frame when it is detected in a video recording process that a user enables a video editing function; then a to-be-edited video frame is determined based on a video frame selection operation that is performed by the user on an original video frame; video editing is performed on the to-be-edited video frame based on a video frame editing operation input by the user, to generate an edited video stream; and finally, a target video stream is generated based on the edited video stream and the original video stream. In this way, the user can select a to-be-edited video frame for editing in the video recording process. This improves video editing flexibility.

Technical solutions provided in embodiments of this application can be applied to a live streaming scenario, or can be applied to another scenario in which a recorded video stream is transmitted in real time. For ease of understanding, the live streaming scenario is used as an example for description in embodiments of this application.

In embodiments of this application, the terminal device may be an electronic device that has video display and processing functions, such as a smartphone, a computer, a tablet computer, a smart wearable device, or a video recorder.

Specific embodiments are used below to describe the technical solutions of this application in detail. The following specific embodiments may be combined with each other, and a same or similar concept or process may not be described repeatedly in some embodiments.

Figure 1:
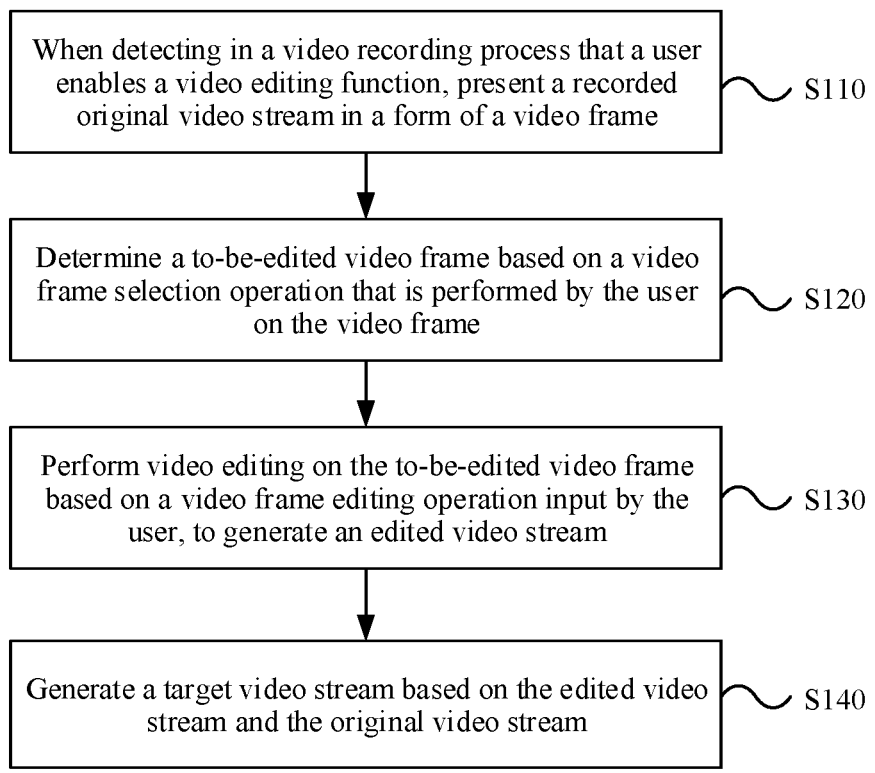
FIG. 1 is a schematic flowchart of a video processing method according to an embodiment of this application.

FIG. 1 is a schematic flowchart of a video processing method according to an embodiment of this application. As shown in FIG. 1, the method provided in this embodiment may include the following steps.

S110: When detecting in a video recording process that a user enables a video editing function, present a recorded original video stream in a form of a video frame.

Specifically, a terminal device may provide a video editing function enabling identifier, for example, may provide a video editing function enabling icon in a video recording interface, and the user may enable the video editing function by selecting the identifier. Alternatively, the terminal device may predefine a gesture for enabling the video editing function, for example, a double-tap operation, and the user may enable the video editing function by inputting the predefined gesture. Alternatively, the terminal device may further predefine a voice instruction for enabling the video editing function, and the user may enable the video editing function by inputting the voice instruction.

To facilitate the user in viewing a recording and editing effect, the terminal device may provide a preview function, and the user may enable the preview function, and enable the video editing function in a preview interface. For example, the user may enable the video editing function by performing a tap operation in the preview interface.

Figure 2:
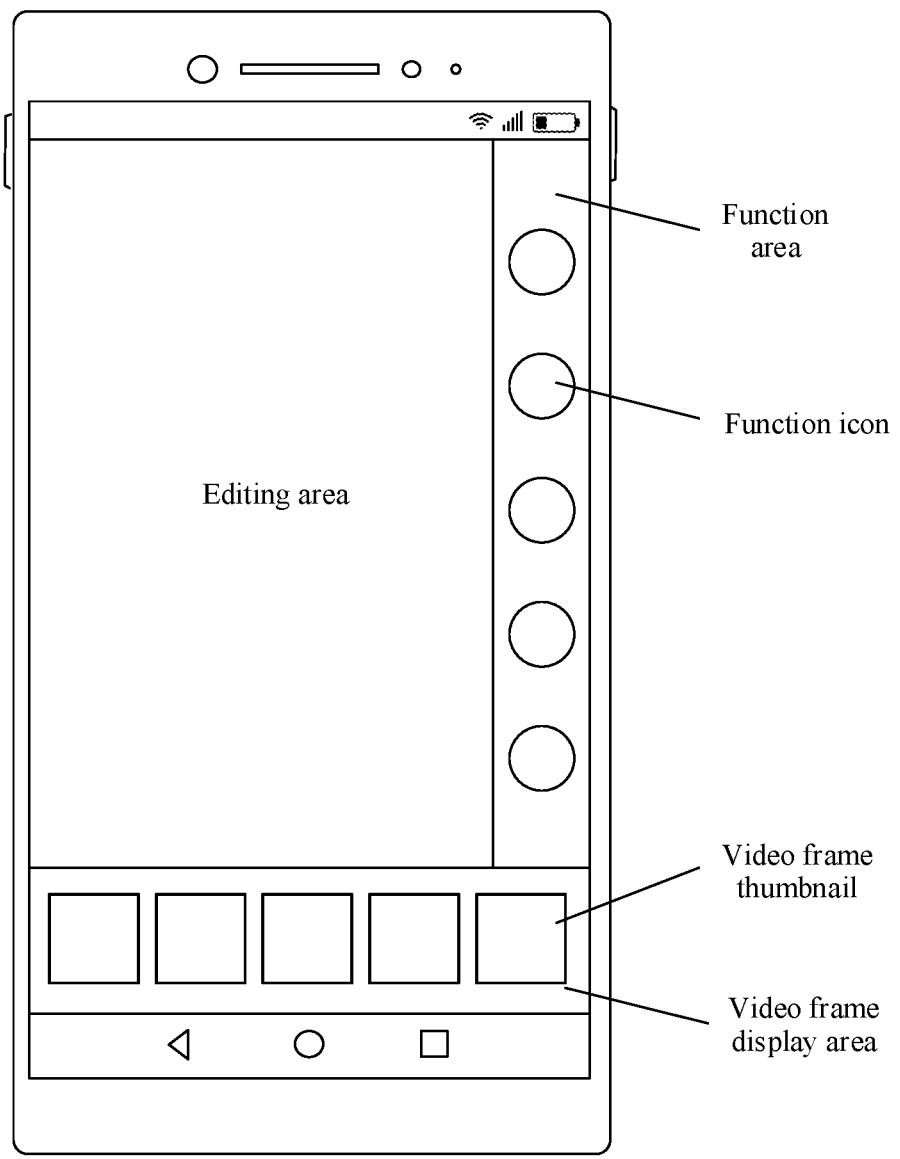
FIG. 2 is a schematic diagram of a video editing interface according to an embodiment of this application.

After detecting that the user enables the video editing function, the terminal device may display a video editing interface for the user to perform a video editing related operation. FIG. 2 is a schematic diagram of a video editing interface according to an embodiment of this application. As shown in FIG. 2, the terminal device may present the original video stream in the form of the video frame in the video editing interface. To be specific, the terminal device may split the original video stream into video frames one by one, and display the video frames obtained through splitting for the user to select a to-be-edited video frame.

During specific implementation, icons of video frames (for example, thumbnails of the video frames shown in FIG. 2) may be sequentially displayed in a video frame display area. The video frame display area may be a part of a display area in the video editing interface shown in FIG. 2. In this case, the video editing interface may further include an editing area for editing and displaying a selected video frame and/or a function area for providing a function icon. Alternatively, the video frame display area may be the entire display area in the video editing interface. In this case, the terminal device may display the editing area and/or the function area after the user selects a video frame.

S120: Determine a to-be-edited video frame based on a video frame selection operation that is performed by the user on the video frame.

Specifically, the user may browse more video frames by performing a slide operation in the video frame display area, and perform the video frame selection operation on a displayed video frame to determine the to-be-edited video frame. The video frame selection operation may be a tap operation on a video frame or another predefined gesture for selecting a video frame.

To further improve video editing flexibility, in this embodiment, the user may set an editing effect application range, that is, a video frame to which an editing effect of a to-be-edited video frame can be applied. After determining the to-be-edited video frame, the terminal device determines an association frame of the to-be-edited video frame based on the editing effect application range of the to-be-edited video frame, and also determines the association frame as a to-be-edited video frame. The association frame is a video frame that is indicated by the editing effect application range and for which a same editing effect as the to-be-edited video frame is used.

The editing effect application range may include at least one of the following: an editing effect is applied to a corresponding to-be-edited video frame; an editing effect is applied to a corresponding to-be-edited video frame and some frames following the corresponding to-be-edited video frame; or an editing effect is applied to a corresponding to-be-edited video frame and all frames following the corresponding to-be-edited video frame.

In this embodiment, the user may determine an editing effect application range after selecting the to-be-edited video frame. Specifically, the user may determine an editing effect application range before or after editing a to-be-edited video frame. For example, the user adds a piece of advertisement information to a to-be-edited video frame, and then chooses to display the advertisement information every 30 s. In other words, an editing effect is applied to video frames (that is, association frames) each with a time interval to the to-be-edited video frame being an integer multiple of a target time interval (30 s). In this case, the terminal device also determines these association frames as to-be-edited video frames, and automatically adds the advertisement information to these association frames.

Alternatively, the user may set an editing effect application range by using a settings function of an application before determining the to-be-edited video frame. The terminal device presets the editing effect application range based on a user operation of setting an editing effect application range, and applies the editing effect application range to all video frame editing operations of the user. For example, the editing effect application range preset by the user is as follows: An editing effect is applied to all to-be-edited video frames selected by the user in a video frame selection process. To be specific, the editing effect is applied to a corresponding to-be-edited video frame and some frames following the corresponding to-be-edited video frame, where the frames following the corresponding to-be-edited video frame are to-be-edited video frames selected by the user. Each time the user edits a video, the terminal device applies an editing effect of the first to-be-edited video frame selected by the user to all to-be-edited video frames selected by the user in a current selection process. In this case, an association frame is a to-be-edited video frame selected in the current selection process other than the first to-be-edited video frame, and the user only needs to edit the first selected to-be-edited video frame.

To further improve video editing flexibility, in this embodiment, the user may set different editing effect application ranges for different editing effects. In other words, the terminal device may preset an editing effect application range corresponding to each editing effect based on a user operation of setting an editing effect application range.

For example, for an advertisement addition function, the user may specify that an added advertisement is displayed every 30 s. In other words, an editing effect is applied to video frames (that is, association frames) each with a time interval to the to-be-edited video frame being an integer multiple of a target time interval (30 s). For an erase function, the user may specify that the erase function is only applied to a to-be-edited video frame that is currently being edited. In other words, an editing effect is applied to a corresponding to-be-edited video frame. For a background replacement function, the user may specify that background replacement is applied to all video frames. In other words, an editing effect is applied to a corresponding to-be-edited video frame and all frames following the corresponding to-be-edited video frame. In this case, in a video editing process, when the user adds an advertisement to a to-be-edited video frame, the terminal device determines that a video frame with a time interval to the to-be-edited video frame being an integer multiple of 30 s is an association frame of the to-be-edited video frame. When the user performs an erase operation on a to-be-edited video frame, the terminal device determines that an association frame of the to-be-edited video frame is 0. When the user performs background replacement on a to-be-edited video frame, the terminal device determines that all video frames following the to-be-edited video frame are association frames of the to-be-edited video frame.

S130: Perform video editing on the to-be-edited video frame based on a video frame editing operation input by the user, to generate an edited video stream.

Specifically, after selecting the to-be-edited video frame, the user may input the video frame editing operation to perform video editing on the to-be-edited video frame.

During specific implementation, as shown in FIG. 2, the terminal device may display the editing area and the function area in the video editing interface, and may provide identifiers of various predefined editing functions (for example, text identifiers or function icons shown in FIG. 2) in the function area; and the user may select a function icon in the function area to edit the to-be-edited video frame displayed in the editing area. The terminal device may automatically display the first to-be-edited video frame selected by the user in the editing area, or display the first to-be-edited video frame in the editing area based on a related operation (for example, a drag operation) input by the user.

The predefined editing functions may be some simple editing functions, for example: an erase function, where the user may use this function to erase or delete an area or an object in the to-be-edited video frame; an advertisement addition function, where the user may use this function to add a specified advertisement to a location in the to-be-edited video frame; a picture addition function, where the user may use this function to add a preset picture or an animated picture to a location in the to-be-edited video frame; a background replacement function, where the user may use this function to replace a background of the to-be-edited video frame; and a beautification function, where the user may use this function to change a clothing color and/or a hair style of a person in the to-be-edited video frame. The predefined editing functions on the terminal device may include at least one of the foregoing enumerated editing functions, and may further include another editing function. This is not specifically limited in this embodiment.

The video frame editing operations input by the user include a series of operations performed by the user in a video frame editing process, for example, an editing operation performed on the to-be-edited video frame by selecting an editing function in the function area and the foregoing operation of determining the editing effect application range after the to-be-edited video frame is selected. The terminal device performs corresponding video editing on the to-be-edited video frame based on the video frame editing operation input by the user, so that a video frame obtained through the editing can present a corresponding editing effect when being played. Then, the terminal device may generate the edited video stream based on video frames (subsequently referred to as edited video frames) sequentially obtained through the editing. The edited video frames in the edited video stream may be sequenced based on editing completion time of the video frames.

In this embodiment, frame header information of a video frame in the edited video stream includes frame header information of a corresponding to-be-edited video frame, and may further include: editing information such as editing time and/or a frame size of the video frame. This facilitates a back-end processing module in identifying an edited video frame. The editing time may be editing start time, or may be editing completion time. The edited video frame may also include other editing information such as an editing effect. The editing information may be specifically selected according to a requirement. This is not specifically limited in this embodiment.

It should be noted that various operations input by the user in this embodiment of this application may be manual operations, or may be voice instruction input operations. For ease of description, a manual operation is used as an example for description in this embodiment of this application.

S140: Generate a target video stream based on the edited video stream and the original video stream.

In this embodiment, because the terminal device generates the edited video stream by extracting an edited video stream from the original video stream, the original video stream is not interrupted, and subsequent processing may continue to be performed. The target video stream is generated by inserting a video frame in the edited video stream into a corresponding location in the original video stream. This ensures real-time transmission of the video stream.

In a process of generating the target video stream, the original video stream and the edited video stream need to be transmitted and processed between functional modules inside the terminal device. In this embodiment, video data of a to-be-edited video frame in the original video stream may be removed, to improve processing efficiency of the terminal device, and to reduce a data transmission and processing amount. In addition, during generation of the target video stream is generated, the video frame in the edited video stream needs to be inserted into the corresponding location in the original video stream. In this embodiment, the to-be-edited video frame in the original video stream may be replaced with a null frame for location occupation, to reduce the data transmission and processing amount and improve efficiency of generating the video stream. In this case, when the target video stream is subsequently synthesized, a corresponding edited video frame is quickly inserted into a transmission video stream based on a null frame location. For an actual internal implementation process of the method, refer to FIG. 3.

Figure 3:
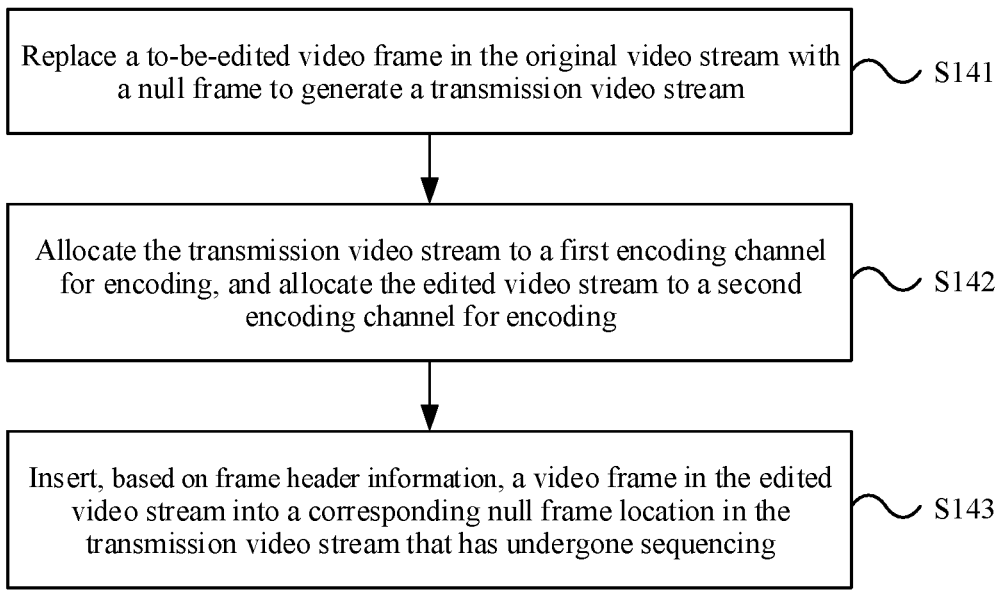
FIG. 3 is a schematic flowchart of a target video stream generating method according to an embodiment of this application.

FIG. 3 is a schematic flowchart of a target video stream generating method according to an embodiment of this application. As shown in FIG. 3, the actual internal implementation process for step S140 may include the following steps:

S141: Replace a to-be-edited video frame in the original video stream with a null frame to generate the transmission video stream.

Specifically, the null frame may include only frame header information of the corresponding to-be-edited video frame, to reduce a data amount of the transmission video stream. The frame header information includes some basic information of the to-be-edited video frame, for example, a frame size and a frame location. The frame location is a location of the to-be-edited video frame in the original video stream, and may be specifically a timestamp.

S142: Allocate the transmission video stream to a first encoding channel for encoding, and allocate the edited video stream to a second encoding channel for encoding.

In this embodiment, after the transmission video stream and the edited video stream are generated, the transmission video stream and the edited video stream may be merged to generate the target video stream. In this embodiment, before the target video stream is generated, the transmission video stream and the edited video stream may first be encoded and compressed, to improve efficiency of transmitting the video stream in the terminal device.

During specific implementation, a plurality of encoding channels may be predefined in the terminal device. During encoding, one part of the encoding channels (that is, the first encoding channel) may be used to encode and compress the transmission video stream, and the other part of the encoding channels (that is, the second encoding channel) may be used to encode and compress the edited video stream. During specific allocation, a quantity of first encoding channels and a quantity of second encoding channels may be dynamically allocated based on a quantity of video frames in the edited video stream. This improves efficiency of transmitting and encoding the video stream. The encoding channel may be implemented based on an internal video stream transmission channel of the terminal. To be specific, the internal video stream transmission channel on which a video stream is encoded and compressed is defined as the encoding channel. The following describes an encoding channel allocation method by using an example in which three encoding channels are predefined in the terminal device.

Figure 4:
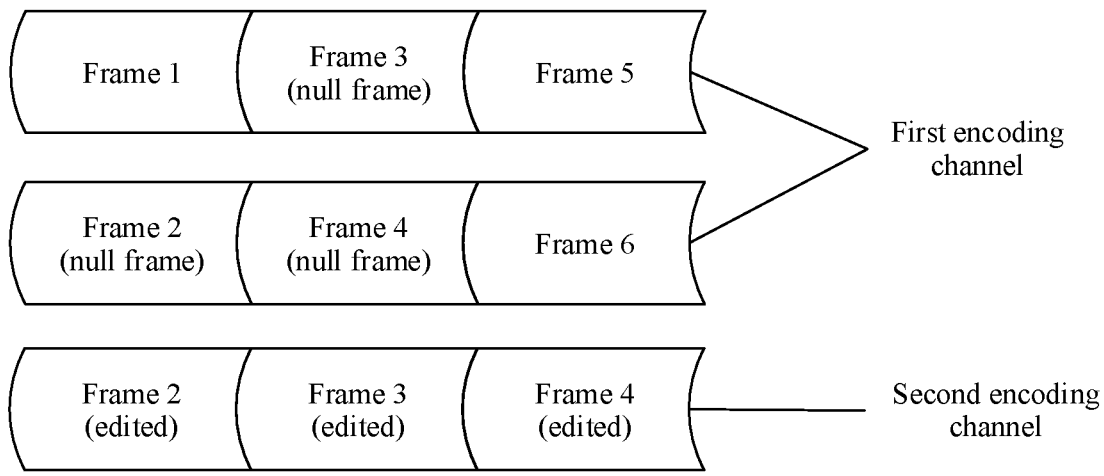
FIG. 4 is a schematic diagram of allocation of an encoding channel according to an embodiment of this application.

FIG. 4 is a schematic diagram of allocation of an encoding channel according to an embodiment of this application. As shown in FIG. 4, during editing, a frame 2, a frame 3, and a frame 4 in the original video stream are edited, and therefore there are few video frames that are edited. In this case, two encoding channels (that is, first encoding channels) may be used to transmit and encode video frames in the transmission video stream. As shown in FIG. 4, a frame 1, a frame 3 (a null frame), and a frame 5 are allocated to one of the first encoding channels, and a frame 2 (a null frame), a frame 4 (a null frame), and a frame 6 are allocated to the other first encoding channel. A third encoding channel (that is, a second encoding channel) is used to transmit and encode video frames: a frame 2 (edited), a frame 3 (edited), and a frame 4 (edited) in the edited video stream.

Figure 5:
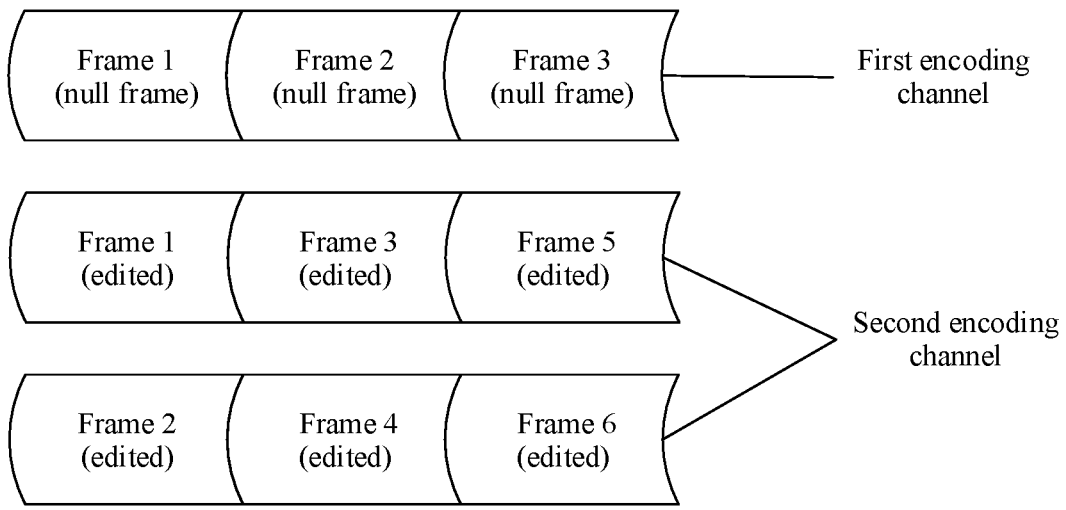
FIG. 5 is another schematic diagram of allocation of an encoding channel according to an embodiment of this application.

FIG. 5 is another schematic diagram of allocation of an encoding channel according to an embodiment of this application. As shown in FIG. 5, during editing, the user applies an editing result to all subsequent frames. In this case, one encoding channel (that is, a first encoding channel) may be used to transmit and encode video frames in the transmission video stream. In this case, all video frames in the transmission video stream are null frames, for example, a frame 1 (a null frame), a frame 2 (a null frame), and a frame 3 (a null frame) shown in FIG. 5. Another two encoding channels (that is, second encoding channels) are used to transmit and encode video frames in the edited video stream. As shown in FIG. 5, a frame 1 (edited), a frame 3 (edited), and a frame 5 (edited) are allocated to one of the second encoding channels, and a frame 2 (edited), a frame 4 (edited), and a frame 6 (edited) are allocated to the other second encoding channel. As memory occupied by the encoding channels is limited, FIG. 5 shows only three null frames. Null frames corresponding to the frame 4, the frame 5 and the frame 6 may be processed after the null frames corresponding to the frame 1, the frame 2 and the frame 3 on the first encoding channel are processed.

It should be noted that a quantity of frames processed on the encoding channel is merely used as an example, and a specific quantity of frames that can be processed on the encoding channel may be determined based on memory allocated to the encoding channel. This is not specifically limited in this embodiment. In addition, when the transmission video stream or the edited video stream is allocated to a plurality of encoding channels, a specific allocation rule may be determined according to a requirement. For example, in FIG. 4, the frame 1, the frame 2 (a null frame), and the frame 3 (a null frame) may be allocated to one of the first encoding channels, and the frame 4 (a null frame), the frame 5 and the frame 6 may be allocated to the other first encoding channel. The specific allocation rule is not specifically limited in this embodiment.

S143: Insert, based on frame header information, a video frame in the edited video stream into a corresponding null frame location in the transmission video stream that has undergone sequencing, to generate the target video stream.

Specifically, after processing such as encoding and compression is performed on the transmission video stream and the edited video stream, the edited video stream may be merged into the transmission video stream to generate the target video stream.

During specific implementation, video frames in the transmission video stream may be sequenced based on frame header information, so that the video frames in the transmission video stream are sequentially arranged; then, for each null frame in the transmission video stream, after a target video frame corresponding to the null frame is found in the edited video stream, the found target video frame is inserted into the corresponding null frame location in the transmission video stream that has undergone sequencing.

During sequencing, an order of the video frames in the transmission video stream that are encoded and compressed may be determined based on frame locations in the frame header information, and then the video frames are sequenced based on the order.

After the sequencing is completed, null frames in the transmission video stream may be processed based on the order of the video frames. Specifically, for each null frame, a video frame (that is, the target video frame) whose frame location is the same as a frame location in the frame header information may be searched from the edited video stream based on the frame location in the frame header information. After being found, the video frame is inserted into the corresponding null frame location.

In this embodiment, after a target video frame corresponding to a null frame is found, the found target video frame may be first checked based on frame header information; and when it is determined that the found target video frame is successfully checked, the target video frame is inserted into the corresponding null frame location in the transmission video stream. In this way, data accuracy of the target video stream is improved.

Because the frame header information includes much video frame information, during specific checking, the frame header information of the null frame may be compared with the frame header information of the corresponding target video frame, to determine a similarity between the frame header information. When a target similarity is met, it is determined that the target video frame is successfully checked.

In this embodiment, before a video frame is determined to be edited, a video frame in the original video stream may be numbered first, and a number is added to frame header information of the corresponding video frame. In this way, a speed of the sequencing and a speed of merging the video streams are increased. In this case, the terminal device may sequence the video frames in the transmission video stream based on video frame numbers, and insert, based on a video frame number, a video frame in the edited video stream into the corresponding null frame location in the transmission video stream that has undergone sequencing.

Specifically, during video stream editing, the terminal device sequentially places video streams in a video stream buffer for processing. During numbering, the original video stream in the video stream buffer may be numbered. After a to-be-edited video frame in the video stream buffer is replaced with a null frame, the transmission video stream is transmitted to an encoding channel for encoding. After being encoded, the transmission video stream may be placed in a transmission buffer. In this case, video frames in the transmission buffer may be sequenced based on video frame numbers. In addition, after the to-be-edited video frame in the video stream buffer is extracted for video editing and encoding, the to-be-edited video frame may be placed in an editing buffer. After the video frames in the transmission buffer are sequenced, null frames in the video frames may be added to an editing queue. After the video frames are transmitted to the editing buffer, the null frames in the editing queue may be sequentially processed. A corresponding target video frame is searched from the editing buffer for each of the null frames based on the video frame numbers, and then the target video frame is inserted into a corresponding null frame location in the transmission buffer. After a target video frame for a null frame is inserted, the corresponding null frame may be deleted from the editing queue, and then a next null frame in the editing queue continues to be processed.

Figure 6:
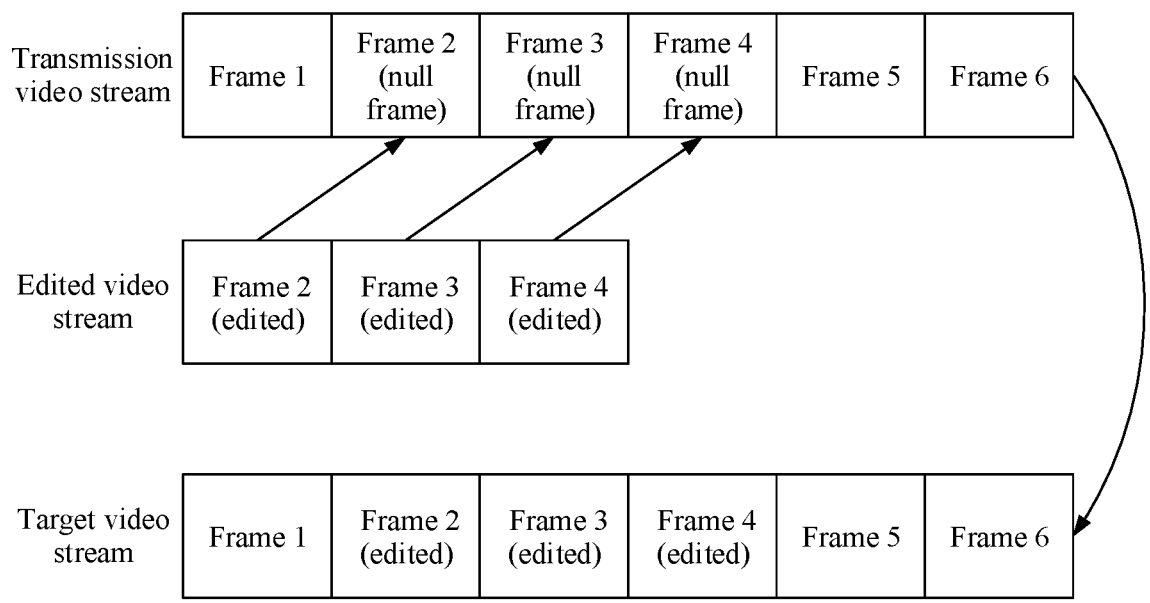
FIG. 6 is a schematic diagram of a target video stream generating process according to an embodiment of this application.

FIG. 6 is a schematic diagram of a target video stream generating process according to an embodiment of this application. As shown in FIG. 6, a transmission video stream in a transmission buffer includes a frame 1, a frame 2 (a null frame), a frame 3 (a null frame), a frame 4 (a null frame), a frame 5, and a frame 6. An edited video stream in an editing buffer includes a frame 2 (edited), a frame 3 (edited) and a frame 4 (edited). During merging, the frame 2 (edited) is inserted into a corresponding null frame location, that is, the frame 2 (the null frame), the frame 3 (edited) is inserted into a corresponding null frame location, that is, the frame 3 (the null frame), and the frame 4 (edited) is inserted into a corresponding null frame location, that is, the frame 4 (the null frame), to generate a target video stream including the frame 1, the frame 2 (edited), the frame 3 (edited), the frame 4 (edited), the frame 5, and the frame 6.

In this embodiment, the sequencing and the video stream merging may be performed based on both the video frame number and the frame location, to increase a processing speed and improve data accuracy. To be specific, the video frames in the transmission video stream are sequenced based on video frame numbers and frame locations, and a video frame in the edited video stream is inserted, based on a video frame number and a frame location, into the corresponding null frame location in the transmission video stream that has undergone sequencing.

Specifically, during sequencing performed for the transmission video stream, the video frames in the transmission video stream may be first sequenced based on the video frame numbers, and then whether an order of the video frames in the transmission video stream is correct is checked based on the video frame locations. The video frames are adjusted if the order is incorrect. Similarly, during search of the target video frame, the target video frame corresponding to the null frame may be first searched from the edited video stream based on the video frame number, and then whether the found target video frame is correct is checked based on the video frame location. When the found target video frame is checked successfully, the target video frame is inserted into the corresponding null frame location in the transmission video stream.

In this embodiment, in a process of inserting the video frame in the edited video stream into the transmission video stream that has undergone sequencing, a video frame preceding to a target null frame in the transmission video stream may be marked to be in a processed state, where the target null frame is an earliest null frame in the transmission video stream. The video frame is marked to be in the processed state, indicating that subsequent processing, for example, transmission, storage, or display, can be performed on the video frame.

During specific implementation, the target null frame may be determined based on the editing queue, and the target null frame is a null frame located at the first position in the editing queue.

In this embodiment, after generating the transmission video stream and the edited video stream, the terminal device may also transmit the transmission video stream and the edited video stream to a target device through different transmission channels, to indicate the target device to insert, based on the frame header information, the video frame in the edited video stream into the corresponding null frame location in the transmission video stream that has undergone sequencing, to generate the target video stream.

The target device may be another terminal device. A process in which the target device generates the target video stream is similar to the foregoing process in which the terminal device generates the target video stream. Details are not described herein again. The transmission channels include a first transmission channel for transmitting the transmission video stream and a second transmission channel for transmitting the edited video stream. Similarly, to improve transmission efficiency, a quantity of first transmission channels and a quantity of second transmission channels may be dynamically allocated based on a quantity of video frames in the edited video stream. An allocation rule for the transmission channels is similar to the allocation rule for the encoding channels. Details are not described herein again.

In an optional implementation, in this embodiment, for a case in which an editing effect is applied to all subsequent video frames, if a real-time requirement is not high, a null frame may be omitted, and a video frame in the original video stream is directly replaced with an edited video frame to generate the target video stream. In other words, when all video frames in the original video stream are to-be-edited video frames, the video frames in the original video stream may be directly replaced with corresponding video frames in the edited video stream, to generate the target video stream.

During specific implementation, after editing the to-be-edited video frames is completed, edited video frames may be directly inserted into the video stream buffer corresponding to the original video stream, to implement replacement of the video frames in the original video stream. Then, a video stream obtained through replacement may be processed by using a processing process similar to an existing video stream processing process. To be specific, all encoding channels are used to process the edited video frames. After being encoded, the edited video frames are placed into the transmission buffer, and then sequenced to generate the target video stream.

According to the video processing method provided in this embodiment, the recorded original video stream is presented in the form of the video frame when it is detected in the video recording process that the user enables the video editing function; then the to-be-edited video frame is determined based on the video frame selection operation that is performed by the user on an original video frame; video editing is performed on the to-be-edited video frame based on the video frame editing operation input by the user, to generate the edited video stream; and finally, the target video stream is generated based on the edited video stream and the original video stream. In this way, the user can select a to-be-edited video frame for editing in the video recording process. This can improve video editing flexibility, and further ensure real-time transmission of the video stream.

Based on a same inventive concept, to implement the foregoing method, an embodiment of this application provides a video processing apparatus. The apparatus embodiment corresponds to the foregoing method embodiments. For ease of reading, details in the foregoing method embodiments are not described one by one again in this apparatus embodiment. However, it should be understood that the apparatus in this embodiment can correspondingly implement all content in the foregoing method embodiments.

Figure 7:
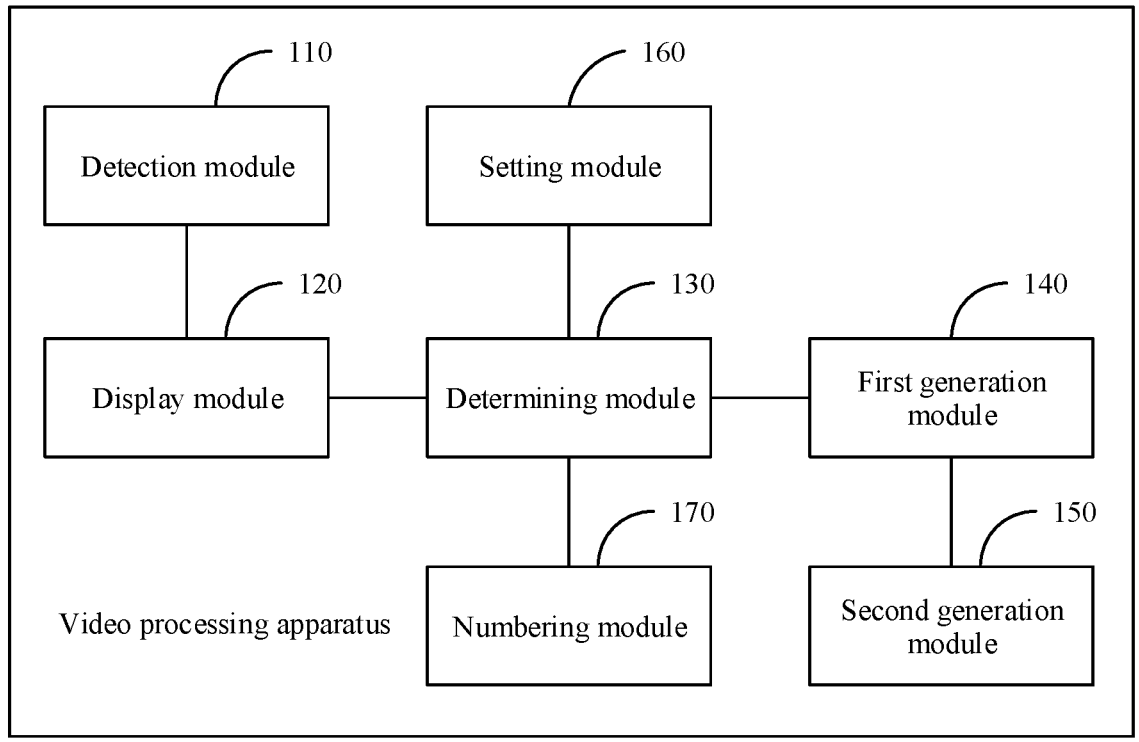
FIG. 7 is a schematic diagram of a structure of a video processing apparatus according to an embodiment of this application.

FIG. 7 is a schematic diagram of a structure of a video processing apparatus according to an embodiment of this application. As shown in FIG. 7, the apparatus provided in this embodiment includes:

a detection module 110, configured to detect in a video recording process whether a user enables a video editing function;

a display module 120, configured to present a recorded original video stream in a form of a video frame when the detection module 110 detects that the user enables the video editing function;

a determining module 130, configured to determine a to-be-edited video frame based on a video frame selection operation that is performed by the user on the video frame;

a first generation module 140, configured to perform video editing on the to-be-edited video frame based on a video frame editing operation input by the user, to generate an edited video stream; and a second generation module 150, configured to generate a target video stream based on the edited video stream and the original video stream.

In an optional implementation of this embodiment of this application, the determining module 130 is further configured to:

determine an association frame of the to-be-edited video frame based on an editing effect application range of the to-be-edited video frame after determining the to-be-edited video frame, where the association frame is a video frame that is indicated by the editing effect application range and for which a same editing effect as the to-be-edited video frame is used, and the editing effect application range is preset or determined by the user after the user selects the to-be-edited video frame; and determine the association frame as a to-be-edited video frame.

In an optional implementation of this embodiment of this application, the editing effect application range is preset, and the apparatus further includes:

a setting module 160, configured to: before the determining module 130 determines the to-be-edited video frame, preset an editing effect application range corresponding to each editing effect based on a user operation of setting an editing effect application range.

In an optional implementation of this embodiment of this application, the editing effect application range includes at least one of the following: an editing effect is applied to a corresponding to-be-edited video frame; an editing effect is applied to a corresponding to-be-edited video frame and some frames following the corresponding to-be-edited video frame; or an editing effect is applied to a corresponding to-be-edited video frame and all frames following the corresponding to-be-edited video frame.

In an optional implementation of this embodiment of this application, the second generation module 150 is specifically configured to:

replace a to-be-edited video frame in the original video stream with a null frame to generate a transmission video stream, where the null frame includes frame header information of the corresponding to-be-edited video frame; and insert, based on frame header information, a video frame in the edited video stream into a corresponding null frame location in the transmission video stream that has undergone sequencing, to generate the target video stream.

In an optional implementation of this embodiment of this application, the second generation module 150 is further configured to:

before generating the target video stream, allocate the transmission video stream to a first encoding channel for encoding, and allocate the edited video stream to a second encoding channel for encoding.

In an optional implementation of this embodiment of this application, a quantity of first encoding channels and a quantity of second encoding channels are dynamically allocated based on a quantity of video frames in the edited video stream.

In an optional implementation of this embodiment of this application, the second generation module 150 is specifically configured to:

sequence video frames in the transmission video stream based on frame header information, so that the video frames in the transmission video stream are sequentially arranged; and for each null frame in the transmission video stream, after a target video frame corresponding to the null frame is found in the edited video stream, insert the found target video frame into a corresponding null frame location in the transmission video stream that has undergone sequencing.

In an optional implementation of this embodiment of this application, the second generation module 150 is further configured to:

check the found target video frame based on frame header information before inserting the found target video frame into the corresponding null frame location in the transmission video stream that has undergone sequencing; and determine that the found target video frame is successfully checked.

In an optional implementation of this embodiment of this application, the apparatus further includes:

a numbering module 170, configured to: before the determining module 130 determines the to-be-edited video frame, number a video frame in the original video stream, and add a number to frame header information of the corresponding video frame; and the second generation module 150 is specifically configured to insert, based on a video frame number, the video frame in the edited video stream into the corresponding null frame location in the transmission video stream that has undergone sequencing.

In an optional implementation of this embodiment of this application, the second generation module 150 is specifically configured to:

insert, based on the video frame number and the frame location, the video frame in the edited video stream into the corresponding null frame location in the transmission video stream that has undergone sequencing.

In an optional implementation of this embodiment of this application, the second generation module 150 is specifically configured to:

transmit the transmission video stream and the edited video stream to a target device through different transmission channels, to indicate the target device to insert, based on the frame header information, the video frame in the edited video stream into the corresponding null frame location in the transmission video stream that has undergone sequencing, to generate the target video stream.

In an optional implementation of this embodiment of this application, the transmission channels include a first transmission channel for transmitting the transmission video stream and a second transmission channel for transmitting the edited video stream, and a quantity of first transmission channels and a quantity of second transmission channels are dynamically allocated based on a quantity of video frames in the edited video stream.

In an optional implementation of this embodiment of this application, the second generation module 150 is further configured to:

in a process of inserting the video frame in the edited video stream into the transmission video stream that has undergone sequencing, mark a video frame preceding to a target null frame in the transmission video stream to be in a processed state, where the target null frame is an earliest null frame in the transmission video stream.

In an optional implementation of this embodiment of this application, frame header information of the video frame in the edited video stream includes editing time and/or a frame size of the video frame.

In an optional implementation of this embodiment of this application, the second generation module 150 is specifically configured to:

if all video frames in the original video stream are to-be-edited video frames, replace the video frames in the original video stream with corresponding video frames in the edited video stream, to generate the target video stream.

The apparatus provided in this embodiment can perform the foregoing method embodiments, and implementation principles and technical effects of the apparatus are similar to those of the foregoing method embodiments. Details are not described herein again.

It should be clearly understood by persons skilled in the art that, for convenient and brief description, division into the foregoing functional units and modules is merely used as an example for illustration. In actual application, the foregoing functions can be allocated to different functional units and modules and implemented according to a requirement, that is, an inner structure of the apparatus is divided into different functional units or modules to implement all or some of the functions described above. Functional units and modules in the embodiments may be integrated into one processing unit, or each of the units may exist alone physically, or two or more units may be integrated into one unit. The integrated unit may be implemented in a form of hardware, or may be implemented in a form of a software functional unit. In addition, specific names of the functional units or modules are merely provided for the purpose of distinguishing the units and modules from one another, but are not intended to limit the protection scope of this application. For a specific working process of the units and modules in the foregoing system, refer to a corresponding process in the foregoing method embodiments. Details are not described herein again.

Figure 8:
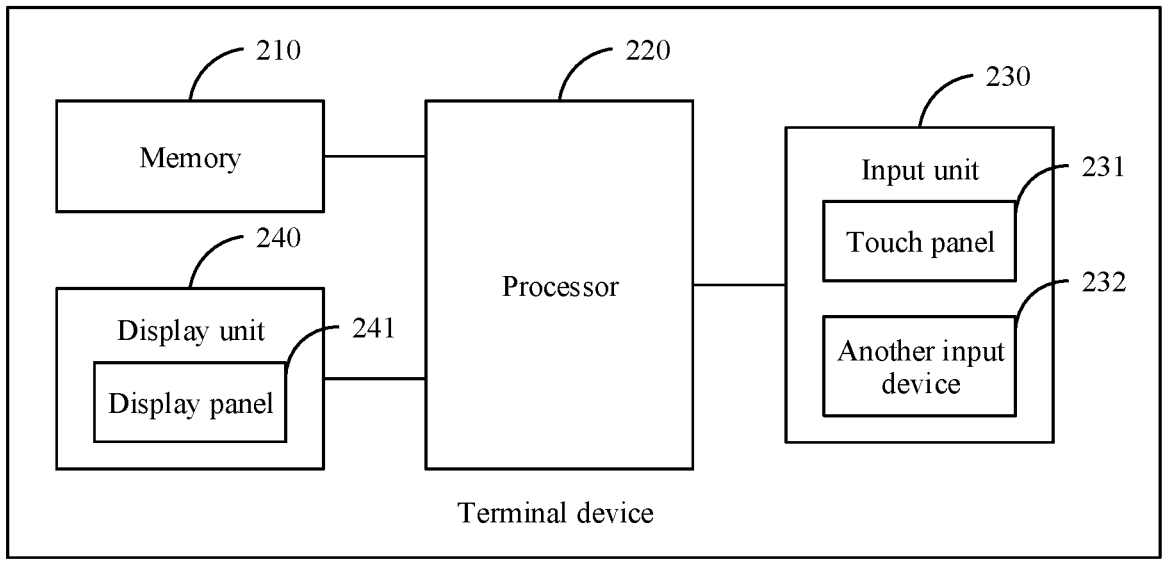
FIG. 8 is a schematic diagram of a structure of a terminal device according to an embodiment of this application.

Based on a same invention concept, an embodiment of this application further provides a terminal device. FIG. 8 is a schematic diagram of a structure of a terminal device according to an embodiment of this application. As shown in FIG. 8, the terminal device provided in this embodiment may include components such as a memory 210, a processor 220, an input unit 230, and a display unit 240.

The following specifically describes the components of the terminal device with reference to FIG. 8.

The memory 210 may be configured to store a computer program and a module. The processor 220 may perform the method in the foregoing method embodiments by running the computer program and the module stored in the memory 210. The memory 210 may mainly include a program storage area and a data storage area. The program storage area may store an operating system, an application program required by at least one function (such as a sound playing function or an image playing function), and the like. The data storage area may store data (such as audio data and a phone book) created based on use of the terminal device, and the like. In addition, the memory 210 may include a high-speed random access memory, and may further include a nonvolatile memory, such as at least one magnetic disk storage component, a flash memory component, or another volatile solid-state storage component.

The input unit 230 may be configured to receive input digit or character information, and generate a key signal input related to a user setting and function control of the terminal device. Specifically, the input unit 230 may include a touch panel 231 and another input device 232. The touch panel 231, also referred to as a touchscreen, may collect a touch operation of a user on or near the touch panel 231 (such as an operation performed by the user on or near the touch panel 231 by using any appropriate object or accessory such as a finger or a stylus), and drive a corresponding connection apparatus based on a preset program. Optionally, the touch panel 231 may include two parts: a touch detection apparatus and a touch controller. The touch detection apparatus detects a touch position of the user, detects a signal generated by a touch operation, and transfers the signal to the touch controller. The touch controller receives touch information from the touch detection apparatus, converts the touch information into touch point coordinates, sends the touch point coordinates to the processor 220, and can receive and execute a command sent by the processor 220. In addition, the touch panel 231 may be implemented in a plurality of types, such as a resistive type, a capacitive type, an infrared type, and a surface acoustic wave type. In addition to the touch panel 231, the input unit 230 may further include another input device 232. Specifically, the another input device 232 may include, but is not limited to, one or more of a physical keyboard, a function button (for example, a sound volume control button or a power button), a trackball, a mouse, a joystick, or the like.

The display unit 240 may be configured to display information input by the user or information provided for the user, and various menus of the terminal device. The display unit 240 may include a display panel 241. Optionally, the display panel 241 may be configured in a form of a liquid crystal display (LCD), an organic light-emitting diode (OLED), or the like. Further, the touch panel 231 may cover the display panel 241. When detecting a touch operation on or near the touch panel 231, the touch panel 231 transmits the touch operation to the processor 220, to determine a type of a touch event. Subsequently, the processor 220 provides a corresponding visual output on the display panel 241 based on the type of the touch event. Although in FIG. 8, the touch panel 231 and the display panel 241 are used as two separate parts to implement input and output functions of the terminal device, in some embodiments, the touch panel 231 and the display panel 241 may be integrated to implement the input and output functions of the terminal device.

The processor 220 is a control center of the terminal device, is connected to all parts of the entire terminal device by using various interfaces and lines, and performs various functions of the terminal device and data processing by running or executing a software program and/or a module stored in the memory 210 and by invoking data stored in the memory 210, to perform overall monitoring on the terminal device. Optionally, the processor 220 may include one or more processing units.

The terminal device further includes a power supply (for example, a battery) (not shown) that supplies power to all components. Preferably, the power supply may be logically connected to the processor 220 by using a power management system, to implement functions such as charge management, discharge management, and power consumption management by using the power management system.

The terminal device may further include a camera (not shown). Optionally, the camera on the terminal device may be a front-facing camera or a rear-facing camera. This is not limited in this embodiment of this application.

Optionally, the terminal device may include one camera, two cameras, three cameras, or the like. This is not limited in this embodiment of this application. For example, the terminal device may include three cameras: one main camera, one wide-angle camera, and one long-focus camera.

Optionally, when the terminal device includes a plurality of cameras, the plurality of cameras may all be front-facing cameras, or may all be rear-facing cameras, or some of the cameras may be front-facing cameras, and the other cameras may be rear-facing cameras. This is not limited in this embodiment of this application.

The terminal device provided in this embodiment may perform the foregoing method embodiments, and implementation principles and technical effects of the terminal device are similar to those of the foregoing method embodiments. Details are not described herein again.

Persons skilled in the art may understand that FIG. 8 is merely an example of the terminal device, and does not constitute a limitation to the terminal device. The terminal device may include more or fewer components than those shown in the figure. Some components may be combined, or different component arrangements may be used.

An embodiment of this application further provides a computer-readable storage medium. The computer-readable storage medium stores a computer program. When the computer program is executed by a processor, the method in the foregoing method embodiments is implemented.

An embodiment of this application further provides a computer program product. When the computer program product runs on a terminal device, the terminal device is enabled to perform the method in the foregoing method embodiments.

When the foregoing integrated unit is implemented in the form of a software functional unit and sold or used as an independent product, the integrated unit may be stored in a computer-readable storage medium. Based on such an understanding, in this application, all or some of the procedures of the methods in the foregoing embodiments may be implemented by a computer program instructing related hardware. The computer program may be stored in a computer-readable storage medium. When the computer program is executed by a processor, the steps in the foregoing method embodiments can be implemented. The computer program includes computer program code, and the computer program code may be in a source code form, an object code form, an executable file form, some intermediate forms, or the like. The computer-readable storage medium may include at least any entity or apparatus that can include the computer program code in a photographing device/terminal device, a recording medium, a computer memory, a read-only memory (ROM), a random access memory (RAM), an electrical carrier signal, a telecommunication signal, and a software distribution medium, for example, a USB flash drive, a removable hard disk, a magnetic disk, or an optical disk. In some jurisdictions, according to legislation and patent practice, a computer-readable medium cannot be an electrical carrier signal or a telecommunications signal.

The processor may be a central processing unit (CPU), or may be another general-purpose processor, a digital signal processor (DSP), an application-specific integrated circuit (ASIC), a field-programmable gate array (FPGA) or another programmable logic component, a discrete gate or a transistor logic device, a discrete hardware component, or the like. The general-purpose processor may be a microprocessor, or the processor may be any conventional processor, or the like.

The memory may include forms of a volatile memory, a random access memory (RAM), and/or a non-volatile memory in a computer-readable medium, such as a read-only memory (ROM) or a flash memory (flash RAM). The memory is an example of the computer-readable medium.

In the foregoing embodiments, the descriptions of all embodiments have respective focuses. For a part that is not described or recorded in detail in an embodiment, refer to related descriptions in other embodiments.

Persons of ordinary skill in the art may be aware that, in combination with the examples described in embodiments disclosed in this specification, units and algorithm steps may be implemented by using electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this application.

In embodiments provided in this application, it should be understood that the disclosed apparatus/device and method may be implemented in other manners. For example, the described apparatus/device embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

It should be understood that, when used in the specification and claims of this application, the term "include" indicates presence of described features, entireties, steps, operations, elements, and/or components, but does not exclude presence or addition of one or more other features, entireties, steps, operations, elements, components, and/or collections thereof.

It should be further understood that the term "and/or" used in the specification and claims of this application indicates any combination and all possible combinations of one or more items listed in association, and includes the combinations.

As used in the specification and claims of this application, the term "if" may be interpreted as "when", "once", "in response to determining", or "in response to detecting" depending on the context. Similarly, the phrase "if it is determined" or "if the [described condition or event] is detected" may be interpreted as a meaning of "once determined" or "in response to determining" or "once the [described condition or event] is detected" or "in response to detecting the [described condition or event]" depending on the context.

In addition, in the descriptions of the specification and claims of this application, the terms "first", "second", "third", and the like are merely intended for a purpose of differentiated description, but shall not be understood as an indication or an implication of relative importance.

Referring to "an embodiment" or "some embodiments" or the like in the specification of this application means that one or more embodiments of this application include a specific feature, structure, or characteristic described with reference to the embodiment. Therefore, statements such as "in an embodiment", "in some embodiments", "in some additional embodiments", and "in other embodiments" that appear at different places in this specification do not necessarily mean referring to a same embodiment. Instead, the statements mean "one or more embodiments, but not all embodiments", unless otherwise specifically emphasized. The terms "include", "contain", "have", and their variants all mean "include but are not limited to", unless otherwise specifically emphasized.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A video processing method, applied to a video processing apparatus, the method comprising:
   in response to detecting in a video recording process that a user enables a video editing function, presenting a recorded original video stream in a form of a video frame;
   determining a to-be-edited video frame based on a video frame selection operation that is performed by the user on the video frame;
   performing video editing on the to-be-edited video frame based on a video frame editing operation input by the user, to generate an edited video stream;
   replacing a to-be-edited video frame in the original video stream with a null frame to generate a transmission video stream, wherein the null frame comprises frame header information of the to-be-edited video frame in the original video stream; and
   inserting, based on frame header information, a video frame in the edited video stream into a corresponding null frame location in the transmission video stream that has undergone sequencing, to generate a target video stream.

2. The method according to claim 1, wherein after determining the to-be-edited video frame, the method further comprises:
   determining an association frame of the to-be-edited video frame based on an editing effect application range of the to-be-edited video frame, wherein the association frame is a video frame that is indicated by the editing effect application range and for which a same editing effect as the to-be-edited video frame is used, and the editing effect application range is preset or determined by the user after the user selects the to-be-edited video frame; and
   determining the association frame as another to-be-edited video frame.

3. The method according to claim 2, wherein the editing effect application range is preset, and before determining the to-be-edited video frame, the method further comprises:
   presetting an editing effect application range corresponding to each editing effect based on a user operation of setting an editing effect application range.

4. The method according to claim 2, wherein the editing effect application range comprises at least one of the following:
   an editing effect is applied to a corresponding to-be-edited video frame;
   an editing effect is applied to a corresponding to-be-edited video frame and some frames following the corresponding to-be-edited video frame; or
   an editing effect is applied to a corresponding to-be-edited video frame and all frames following the corresponding to-be-edited video frame.

5. The method according to claim 1, wherein before generating the target video stream, the method further comprises:
   allocating the transmission video stream to a first encoding channel for encoding; and
   allocating the edited video stream to a second encoding channel for encoding.

6. The method according to claim 5, wherein a quantity of first encoding channels and a quantity of second encoding channels are dynamically allocated based on a quantity of video frames in the edited video stream.

7. The method according to claim 1, wherein inserting, based on the frame header information, the video frame in the edited video stream into the corresponding null frame location in the transmission video stream that has undergone sequencing comprises:
   sequencing video frames in the transmission video stream based on frame header information, so that the video frames in the transmission video stream are sequentially arranged; and
   for each null frame in the transmission video stream, after a target video frame corresponding to the null frame is found in the edited video stream, inserting the found target video frame into a corresponding null frame location in the transmission video stream that has undergone sequencing.

8. The method according to claim 7, wherein before inserting the found target video frame into the corresponding null frame location in the transmission video stream that has undergone sequencing, the method further comprises:
   checking the found target video frame based on frame header information; and
   determining that the found target video frame is successfully checked.

9. The method according to claim 1, wherein before determining the to-be-edited frame, the method comprises:
   numbering a video frame in the original video stream, and adding a number to frame header information of the video frame in the original video stream; and
   wherein the inserting, based on the frame header information, the video frame in the edited video stream into the corresponding null frame location in the transmission video stream that has undergone sequencing comprises:
   inserting, based on a video frame number, the video frame in the edited video stream into the corresponding null frame location in the transmission video stream that has undergone sequencing.

10. An apparatus for video processing, wherein the apparatus comprises:
    a processor;
    a memory coupled to the processor and configured to store an instruction, wherein the instruction is executed by the processor and causes the apparatus to perform:
    in response to detecting in a video recording process that a user enables a video editing function, present a recorded original video stream in a form of a video frame;

determine a to-be-edited video frame based on a video frame selection operation that is performed by the user on the video frame;

perform video editing on the to-be-edited video frame based on a video frame editing operation input by the user, to generate an edited video stream;

replace a to-be-edited video frame in the original video stream with a null frame to generate a transmission video stream, wherein the null frame comprises frame header information of the to-be-edited video frame in the original video stream; and insert, based on frame header information, a video frame in the edited video stream into a corresponding null frame location in the transmission video stream that has undergone sequencing, to generate the target video stream.

11. The apparatus according to claim 10, wherein the processor further executes the instruction to perform:

determine an association frame of the to-be-edited video frame based on an editing effect application range of the to-be-edited video frame, wherein the association frame is a video frame that is indicated by the editing effect application range and for which a same editing effect as the to-be-edited video frame is used, and the editing effect application range is preset or determined by the user after the user selects the to-be-edited video frame; and determine the association frame as another to-be-edited video frame.

12. The apparatus according to claim 11, wherein the processor further executes the instruction to perform:

preset an editing effect application range corresponding to each editing effect based on a user operation of setting an editing effect application range.

13. The apparatus according to claim 11, wherein the editing effect application range comprises at least one of the following:

an editing effect is applied to a corresponding to-be-edited video frame;

an editing effect is applied to a corresponding to-be-edited video frame and some frames following the corresponding to-be-edited video frame; or an editing effect is applied to a corresponding to-be-edited video frame and all frames following the corresponding to-be-edited video frame.

14. The apparatus according to claim 10, wherein the processor further executes the instruction to perform:

allocate the transmission video stream to a first encoding channel for encoding; and allocate the edited video stream to a second encoding channel for encoding.

15. The apparatus according to claim 14, wherein a quantity of first encoding channels and a quantity of second encoding channels are dynamically allocated based on a quantity of video frames in the edited video stream.

16. The apparatus according to claim 10, wherein the processor executes the instruction to perform:

sequence video frames in the transmission video stream based on frame header information, so that the video frames in the transmission video stream are sequentially arranged; and for each null frame in the transmission video stream, after a target video frame corresponding to the null frame is found in the edited video stream, insert the found target video frame into a corresponding null frame location in the transmission video stream that has undergone sequencing.

17. The apparatus according to claim 16, wherein the processor further executes the instruction to perform:

check the found target video frame based on frame header information; and determine that the found target video frame is successfully checked.

18. The apparatus according to claim 10, wherein the processor further executes the instruction to perform:

number a video frame in the original video stream, and add a number to frame header information of the video frame in the original video stream; and wherein the processor executes the instruction to perform:

insert, based on a video frame number, the video frame in the edited video stream into the corresponding null frame location in the transmission video stream that has undergone sequencing.

19. A non-transitory computer-readable medium comprising an instruction, wherein a processor executes the instruction to perform:

in response to detecting in a video recording process that a user enables a video editing function, present a recorded original video stream in a form of a video frame;

determine a to-be-edited video frame based on a video frame selection operation that is performed by the user on the video frame;

perform video editing on the to-be-edited video frame based on a video frame editing operation input by the user, to generate an edited video stream; and replace a to-be-edited video frame in the original video stream with a null frame to generate a transmission video stream, wherein the null frame comprises frame header information of the to-be-edited video frame in the original video stream; and insert, based on frame header information, a video frame in the edited video stream into a corresponding null frame location in the transmission video stream that has undergone sequencing, to generate the target video stream.

20. The non-transitory computer readable medium according to claim 19, wherein the processor further executes the instruction to perform: determine an association frame of the to-be-edited video frame based on an editing effect application range of the to-be-edited video frame, wherein the association frame is a video frame that is indicated by the editing effect application range and for which a same editing effect as the to-be-edited video frame is used, and the editing effect application range is preset or determined by the user after the user selects the to-be-edited video frame; and determine the association frame as another to-be-edited video frame.

\* \* \* \* \*

UNITED STATES PATENT AND TRADEMARK OFFICE
CERTIFICATE OF CORRECTION

| | | |
|---|---|---|
| PATENT NO. | : 12,051,446 B2 | Page 1 of 1 |
| APPLICATION NO. | : 17/843690 | |
| DATED | : July 30, 2024 | |
| INVENTOR(S) | : Du et al. | |

It is certified that error appears in the above-identified patent and that said Letters Patent is hereby corrected as shown below:

In the Claims

Claim 19: Column 26, Line 23: reads as "Anon-transitory computer-readable medium compris-"
should read as -- A non-transitory computer-readable medium compris- --.

Signed and Sealed this
Twenty-ninth Day of April, 2025

Coke Morgan Stewart
*Acting Director of the United States Patent and Trademark Office*